US010352107B2

(12) United States Patent
Delaunay et al.

(10) Patent No.: US 10,352,107 B2
(45) Date of Patent: Jul. 16, 2019

(54) SEALING ARRANGEMENTS FOR SUBSEA PIPE-IN-PIPE SYSTEMS

(71) Applicant: Acergy France SAS, Suresnes (FR)

(72) Inventors: Nathalie Delaunay, Saint Germain en Laye (FR); Gerald Gerometta, Paris (FR); Henri Rousseau, Paris (FR)

(73) Assignee: Acergy France SAS, Suresnes (FR)

(*) Notice: Subject to any disclaimer, the term of this patent is extended or adjusted under 35 U.S.C. 154(b) by 0 days.

(21) Appl. No.: 15/547,791

(22) PCT Filed: Feb. 2, 2016

(86) PCT No.: PCT/IB2016/000160
§ 371 (c)(1),
(2) Date: Jul. 31, 2017

(87) PCT Pub. No.: WO2016/125010
PCT Pub. Date: Aug. 11, 2016

(65) Prior Publication Data
US 2018/0023767 A1    Jan. 25, 2018

(30) Foreign Application Priority Data

Feb. 3, 2015    (GB) .................................. 1501775.9

(51) Int. Cl.
F16L 53/00    (2018.01)
E21B 17/00    (2006.01)
(Continued)

(52) U.S. Cl.
CPC .......... E21B 17/003 (2013.01); E21B 36/003 (2013.01); E21B 36/005 (2013.01);
(Continued)

(58) Field of Classification Search
CPC ... F16L 53/38; F16L 53/30; F16L 9/18; E21B 17/003; E21B 36/005; F17D 1/18; H05B 3/44
(Continued)

(56) References Cited

U.S. PATENT DOCUMENTS 3,407,835 A * 10/1968 Rolfes ...................... F16L 9/18
                                                    137/340
4,194,536 A *  3/1980 Stine ..................... F16L 59/145
                                                    138/103
4,869,533 A *  9/1989 Lehmann .............. B29C 65/342
                                                    285/21.2
5,390,961 A *  2/1995 Guthrie ................... F16L 59/14
                                                    285/41
6,202,656 B1 * 3/2001 Schmitt ............. H01L 21/67023
                                                    134/105
(Continued)

FOREIGN PATENT DOCUMENTS

BR    P10605003    8/2008
EP    1 509 719    12/2003
(Continued)

Primary Examiner — James F Hook
(74) Attorney, Agent, or Firm — Levy & Grandinetti

(57) ABSTRACT

A method of sealing an annulus of an electrically trace-heated pipe-in-pipe structure including introducing a flowable filler material to mold a sealing mass in situ is disclosed. The sealing mass closes a restriction at which the annulus is narrowed radially and embeds at least one heating element that extends generally longitudinally through the restriction. The structure includes an inner ring spaced within an outer ring to define the annulus between the rings. The annulus is narrowed radially by one or more projections that extend radially into the annulus from at least one of the rings toward the other of said rings. The restriction may include multiple bores, each of which may contain a sealing mass around a respective heating element in the bore.

21 Claims, 12 Drawing Sheets

(51) Int. Cl.

| | | |
|---|---|---|
| F16L 9/18 | (2006.01) | |
| F16L 7/00 | (2006.01) | |
| F16L 59/065 | (2006.01) | |
| F16L 1/12 | (2006.01) | |
| F16L 1/16 | (2006.01) | |
| F17D 1/18 | (2006.01) | |
| E21B 36/04 | (2006.01) | |
| E21B 43/01 | (2006.01) | |
| H05B 3/42 | (2006.01) | |
| F16L 53/38 | (2018.01) | |
| F16L 53/30 | (2018.01) | |
| E21B 36/00 | (2006.01) | |
| E21B 43/013 | (2006.01) | |
| F16L 7/02 | (2006.01) | |
| F16L 9/19 | (2006.01) | |
| F17D 3/01 | (2006.01) | |

(52) U.S. Cl.
CPC ............ *E21B 36/04* (2013.01); *E21B 43/01* (2013.01); *E21B 43/013* (2013.01); *F16L 1/123* (2013.01); *F16L 1/16* (2013.01); *F16L 7/00* (2013.01); *F16L 7/02* (2013.01); *F16L 9/18* (2013.01); *F16L 9/20* (2013.01); *F16L 53/30* (2018.01); *F16L 53/38* (2018.01); *F16L 59/065* (2013.01); *F17D 1/18* (2013.01); *F17D 3/01* (2013.01); *H05B 3/42* (2013.01); *F16L 9/19* (2013.01); *H05B 2214/03* (2013.01)

(58) Field of Classification Search
USPC .................................. 138/33, 114, 112, 108
See application file for complete search history.

(56) References Cited

U.S. PATENT DOCUMENTS

| | | | |
|---|---|---|---|
| 8,833,440 B1 * | 9/2014 | Dicksinson | ............ E21B 43/24 165/163 |
| 2003/0017007 A1 | 1/2003 | Bass et al. | |
| 2003/0178842 A1 | 9/2003 | Gallagher | |
| 2004/0245768 A1 | 12/2004 | Giacomelli et al. | |
| 2005/0212285 A1 | 9/2005 | Haun | |
| 2013/0014833 A1 * | 1/2013 | Geertsen | ............... F16L 53/008 137/341 |
| 2013/0213487 A1 * | 8/2013 | Qu | .......... F16L 53/38 137/13 |
| 2014/0241810 A1 * | 8/2014 | Lynch | ....... F16L 1/26 405/170 |
| 2014/0367959 A1 * | 12/2014 | Lynch | ....... F16L 1/19 285/133.11 |
| 2015/0053293 A1 * | 2/2015 | Ophaug | ............... B29D 23/001 138/33 |
| 2015/0338010 A1 * | 11/2015 | Marchal | ................... F16L 9/18 138/33 |
| 2018/0087694 A1 * | 3/2018 | Cherkaoui | ............. E21B 36/04 |

FOREIGN PATENT DOCUMENTS

| | | |
|---|---|---|
| FR | 2 991 024 | 11/2013 |
| GB | 2492883 | 1/2013 |
| GB | 2493545 | 2/2013 |
| WO | WO 00/06933 | 2/2000 |
| WO | WO 01/02764 | 1/2001 |
| WO | WO 02/16732 | 2/2002 |
| WO | WO 2009/083937 | 7/2009 |
| WO | WO 2014/029644 | 2/2014 |
| WO | WO 2016/062319 | 6/2014 |

* cited by examiner

SEALING ARRANGEMENTS FOR SUBSEA PIPE-IN-PIPE SYSTEMS

This invention relates to rigid pipelines of pipe-in-pipe ('PiP') construction, suitable for subsea applications. More specifically, the invention relates to electrically trace-heated PiP pipelines, and particularly to sealing arrangements for the annulus of such a pipeline.

Subsea pipelines are used in oil and gas production as 'tie-backs' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the production fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is only thermally insulated. One example of a passive system is a PiP structure comprising a fluid-carrying inner pipe positioned concentrically within an outer pipe. The inner and outer pipes may be of steel or composite material, or one pipe may be of steel and the other pipe may be of composite. The pipes are spaced from each other to define an insulating annulus between them. Typically, insulating material is disposed in the annulus; it is also common to draw down a partial vacuum in the annulus to reduce transmission of heat through the annulus.

PiP structures provide high-performance thermal insulation by virtue of the annulus. Their double-walled construction also enhances mechanical strength and leak protection.

In active thermal management systems, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732.

Electrically trace-heated PiP (ETH PiP) employs a combination of passive and active thermal management measures to manage the temperature of production fluids particularly effectively. GB 2492883 and WO 2014/029644 disclose typical electrically trace-heated PiP flowline sections. A further example of electrically trace-heated PiP is shown in FIG. 1 of the drawings.

In a length of ETH PiP as shown in FIG. 1, low-voltage electric heating elements 10 such as copper wires are disposed around a steel inner pipe 12 of a PiP assembly 14.

Thus, the heating elements 10 lie within the annulus 16 defined between the inner pipe 12 and an outer pipe 18 of the PiP assembly 14. In this example, the heating elements 10 extend longitudinally along the PiP assembly 14 in parallel to its central longitudinal axis, although the heating elements 10 could instead be twisted helically around the inner pipe 12 or arranged in a wave pattern—known in the art as an S-Z layout—along the inner pipe 12. One or more other longitudinally-extending elements 20 such as fibre-optic data cables or power cables may be positioned beside and between the heating elements 10. The annulus 16 may also contain an insulating layer 22 that overlays the heating elements 10 and other elements 20 as shown. Again, air may be evacuated from the annulus 16.

Although not shown in FIG. 1, electrical power is suitably provided to the heating elements 10 by subsea electrical cables that are connected to the electrically trace-heated PiP system underwater via wet-mateable electrical connectors. Another approach is to splice an end of the heating elements 10 to a subsea electrical cable above the surface, aboard an installation vessel.

Whatever thermal management system is employed, it is important to maintain thermal management continuously along the length of a pipeline. Otherwise, 'cold spots' will arise, which increase the likelihood of plugs forming at those locations. Similarly, for ease of manufacture and for reliability, it is beneficial to avoid discontinuities due to splices or other connections in the heating elements 10 or in other longitudinally-extending elements 20 such as fibre-optic cables.

PiP pipelines may be fabricated offshore on, and laid from, a pipelaying vessel using J-lay or S-lay techniques. In those techniques, PiP pipe joints are welded successively at field joints to an upper end of a pipe string extending as a catenary toward the seabed from a hang-off mechanism or tensioner of the vessel. The welds are tested and the field joints are coated before each new section of the pipe string is launched into the sea. Accessories are incorporated into the pipeline between pipe joints at appropriate intervals and are launched with the pipe string into the sea.

PiP pipelines may also be laid in reel-lay operations, in which the pipeline is prefabricated at a coastal spoolbase that a reel-lay vessel visits for loading. At the spoolbase, the pipeline is spooled onto a reel carried by the vessel. During subsequent pipelaying at sea, the pipeline is unspooled from the reel and straightened. Accessories may be incorporated into the pipeline at appropriate intervals during laying by cutting through an unspooled length of the pipeline and welding the cut ends to opposite sides of the accessory.

Once closed, the annulus of a PiP pipeline can be evacuated on a vessel offshore. However, if possible, the annulus of a PiP pipeline is evacuated during an onshore pre-fabrication process as this removes that operation from the critical path during subsequent offshore operations.

There is a need to provide arrangements for sealing and isolating closed compartments or sections of the annulus of a PiP pipeline. Such sections have to be sealed in an air-tight, vacuum-tight or water-tight manner. For example, where the annulus of a PiP pipeline is evacuated during an onshore pre-fabrication process, effective sealing is necessary to create and maintain a partial vacuum.

Effective sealing may also be necessary to create a waterstop. If the outer pipe is breached due to a failure, a waterstop serves as a barrier that isolates a flooded section of the annulus by preventing seawater entering adjacent sections of the annulus. This makes repair and refurbishment of the damaged pipeline easier and less expensive.

Clearly, a waterstop must resist external hydrostatic pressure if it is to maintain the integrity of the remainder of the pipeline. Hydrostatic pressure on one side of the waterstop exposed to a flooded section of the annulus may of course be extremely high at great depth, whereas pressure on the other side of the waterstop exposed to an adjoining section of the annulus will be very much lower. This imbalance of pressures is greater if the adjoining section of the annulus contains a partial vacuum.

Effective sealing is particularly challenging in ETH PiP arrangements. Here, there is a need to accommodate and seal around longitudinally-extending elements such as heating elements or fibre-optic cables, without introducing discontinuities that will complicate manufacture and that could lead to failures.

A PiP sealing system must also be able to accommodate differential elongation of the inner and outer pipe under thermal influences. In particular, the engagement between the metal of a pipe and a plastics seal must be sufficiently strong to avoid disengagement due to shear stress, which could create a leakage path.

FR 2991024 discloses a full forged steel bulkhead connecting the inner and outer pipes of an ETH PiP system. Bores penetrate the bulkhead, and electrical wires are connected to respective sides of penetrators fitted into the bores. The drawbacks of this solution are fragility, discontinuity and the high cost of penetrators. Also, when the pipeline is bent as during spooling onto a reel, the bulkhead assembly will ovalise slightly in cross-section; penetrators may not ensure sufficient leak-tightness because each bore containing a penetrator will also ovalise locally. Additionally, some bores may remain empty, which will preclude sealing between successive annulus sections separated by the bulkhead.

In BR PI0605003, an elastomeric sealing ring for an ETH PiP system is compressed axially between a closing ring and an L-shaped front ring. This causes the sealing ring to expand radially to fill the full radial width of the annulus and so to seal against the inner and outer pipes. Penetrators for electric cables or optical fibres are carried by the sealing ring or the front ring. All parts are pre-fabricated and assembled inside the annulus. A drawback is that a large number of separate elements need to be assembled, which complicates manufacture and creates failure points. Additionally, leak paths may remain if the sealing ring is not sufficiently expanded radially by longitudinal axial compression.

EP 1509719 discloses a waterstop assembly for an ETH PiP system comprising a polymeric ring that is inserted into the annulus to close the annulus. The ring is penetrated by longitudinal bores for electrical heating cables and contains a sealing system to close the bores around the cables. The ring comprises lip seals that may not be vacuum-tight even if they are water-tight. Also, lip seals are not efficiently tight around cables that move during installation. There remains a need for more effective sealing.

US 2003/017007 describes waterstops formed in the annulus of a direct electrically heated PiP pipeline. The arrangement described in US 2003/017007 would not provide sufficient sealing around electrical heating cables.

WO 01/02764 discloses a buckle arrestor for a PiP system that is moulded in place inside the annulus to span the full radial width of the annulus between the inner and outer pipes. Whilst a buckle arrestor is designed to provide mechanical resistance and so has a function that is very different to the function of a waterstop, WO 01/02764 suggests that the moulded-in-place buckle arrestor may be leak-tight. However, there is no teaching of how the buckle arrestor could be interfaced with longitudinally-extending elements such as heating elements or fibre-optic cables, which as noted above present special challenges for effective sealing.

FR 29910204 describes a reinforcing ring for the annulus of a PiP arrangement which allows electrical heating elements of adjacent PiP pipeline sections to be connected.

WO 00/06933 describes a pipe liner for inserting into the annulus of a PiP pipeline. The liner comprises channels which accommodate longitudinally extending heating elements.

US 2003/0178842 describes complementary coupling means for attaching adjacent sections of PiP pipeline.

It is against this background that the invention has been devised.

Briefly, the invention provides a means for holding elevated seawater pressure versus reduced pressure between consecutive annulus sections of an electrically trace-heated pipe-in-pipe flowline system. To achieve this, the invention provides one or more elastomeric parts, for example of a polymer such as polypropylene, that are moulded in situ between the inner and outer pipes and around elongate elements such as heating wires and fibre-optic cables. There is no need for any electrical or optical discontinuity in those elements, such as a spliced connection.

Instead of having a single elastomeric moulded part, there may be multiple elastomeric mouldings such as individual elastomeric mouldings around each heating wire or other elongate element.

In one aspect, therefore, the invention may be expressed as an electrically trace-heated pipe-in-pipe structure, comprising: an inner ring spaced within an outer ring to define an annulus between said rings; a restriction at which the annulus is narrowed radially; at least one elongate heating element extending generally longitudinally along the annulus and through the restriction; and at least one sealing mass that is moulded in situ to close the restriction by bridging the restriction radially, and to embed the or each heating element in the restriction. The annulus may, for example, be narrowed by at least one projection that extends radially into the annulus from at least one of said rings toward the other of said rings, and that may be integral with either of the rings.

A ring, a projection, or at least a part of a ring that defines the restriction, such as a projection that is integral with a ring, may typically be a short tubular section whose diameter exceeds its length. Also, a ring, a projection, or a part of a ring that defines the restriction may either be separate from and attached to longer pipe sections or integral with longer pipe sections. For example, for steel pipe, it may ease manufacture to weld a ring with an internal projection in series with inner and/or outer pipe sections. Conversely, for composite pipe, it may be easier to vary the cross-section of the inner and/or outer pipes locally during extrusion or pultrusion of the whole pipe, such that a ring with an internal projection is integral with the pipe.

A ring and a projection could be of the same material, being integral with each other or attached to each other by, for example, welding or bonding. Alternatively, a ring and a projection could be of different materials attached to each other by, for example, welding or bonding.

Possible materials for a ring and/or a projection include metals, plastics and composites. If the ring and/or the projection are of plastics material, this may allow better management of shear stress when the inner pipe expands and contracts relative to the outer pipe in use.

The restriction enables a stable, strong and effective seal to be made between successive sections of an annulus and enables that seal to be made with less filler material, which reduces cost and saves time.

Elongate elements other than heating elements, such as data cables, may also extend generally longitudinally along the annulus and through the restriction to be embedded by the or each sealing mass.

At least one of the inner and outer rings may be integral with, or attached to, an inner or outer pipe. It is also possible for the inner and outer rings to be conjoined via the or each radially-extending projection.

Preferably, the system further comprises at least one insulating layer disposed in the annulus on a radially outer side of the or each heating element, which insulating layer is longitudinally interrupted at the restriction. This allows the or each sealing mass to seal effectively against the inner and outer pipes and/or against the or each projection that defines the restriction.

The or each heating element may, for example, extend longitudinally across at least one projection that defines the restriction, by following an external contour of that projection. For instance, the or each heating element may lie externally upon and extend around that projection from one longitudinal side of the projection to the other. It is, however, possible for the or each heating element to extend through a female formation such as a groove or bore in at least one projection that defines the restriction or between at least two of such projections.

At least one projection that forms the restriction suitably comprises longitudinally-opposed inclined shoulders that define longitudinally-tapering spaces of the annulus. In that case, the or each sealing mass may extend into the longitudinally-tapering spaces to engage and locate the sealing mass relative to the inner and outer rings.

The or each projection reduces the likelihood of a leak by reducing the area of the interface between a pipe and the seal, providing fewer and longer leak paths. Additionally, shear stress caused by differential expansion of the inner and outer pipes is easier to manage with a smaller, more compact seal.

The restriction may comprise a plurality of circumferentially-spaced bores. The restriction may further comprise at least one wall that bridges the restriction radially, such as a radially-extending wall between adjacent bores.

In some embodiments of the invention, the restriction is circumferentially continuous around the inner ring, being partially defined by a circumferentially-continuous land of the or each radially-extending projection.

The restriction may be defined between an inner projection that projects radially outwardly from the inner ring and an outer projection that projects radially inwardly from the outer ring. In that case, the projections suitably confront each other across the narrowed annulus, and the or each sealing mass seals against the projections and around the or each heating element extending through a gap between the projections, to close the gap. Alternatively, the projections may abut or join each other across the annulus, for example via an intermediate ring through which one or more bores extend longitudinally.

A respective sealing mass may seal around the or each heating element extending through one or more bores between the projections, to close the or each bore. Thus, a plurality of heating elements may extend individually through a corresponding plurality of bores, each bore containing a respective sealing mass that seals around a respective one of the heating elements and that closes the bore. Nevertheless, it is possible for two or more of the sealing masses to be joined outside the bores.

To introduce a flowable filler material that sets, hardens or cures to form the or each sealing mass, the structure of the invention may further comprise at least one circumferentially-extending filling channel that communicates between at least one port in the outer ring and the restriction. For example, the filling channel may intersect radially with the restriction, preferably by joining circumferentially-spaced longitudinally-extending bores or grooves that receive the elongate elements. Alternatively, the filling channel may be positioned radially outboard of the restriction in the outer ring and/or in a projection that extends radially into the annulus from the outer ring. In that case, the filling channel may communicate with a plurality of further channels that lead to the restriction. In another approach, the filling channel may be radially outboard of the outer ring and may communicate with a plurality of ports in the outer ring that lead to the restriction.

The inventive concept embraces a corresponding method of sealing an annulus of an electrically trace-heated pipe-in-pipe structure, which annulus is defined between an inner ring and an outer ring spaced outside the inner ring. The method comprises introducing a flowable filler material to mould in situ one or more sealing masses that close a restriction at which the annulus is narrowed radially and that embed at least one heating element that extends generally longitudinally through the restriction.

The sealing mass may be extended into at least one space of the restriction at which the annulus tapers longitudinally.

The or each heating element may be placed into the restriction before moulding the filler material. For example, the or each heating element may be inserted into one or more bores of the restriction.

Alternatively, the restriction may be created around the or each heating element before moulding the filler material. For example, the or each heating element may be supported on the inner ring and then the outer ring may be placed around the or each heating element to complete the restriction. This may involve opposing the or each heating element with a projection of the outer ring that at least partially defines the restriction. In some embodiments, the or each heating element is laid across a projection of the inner ring that at least partially defines the restriction, the or each heating element following an external contour of that projection.

The filler material may be introduced into the restriction through the outer ring, in which case the filler material may be distributed circumferentially before entering the restriction. Alternatively, the filler material may be introduced into the restriction along the annulus. In either case, it is possible for the filler material to be divided between circumferentially-spaced bores of the restriction.

Specific embodiments of the invention have two radial protrusions integral with inner and outer pipes that define a restriction of the surface of the annulus at a pre-determined location. Heating cables and fibre-optic cables are installed along the inner pipe and through this restricted section. Polymeric material is injected, for example using a hose with a nozzle inside the annulus, all around the annulus to close the annulus at this pre-determined location, so that it ensures vacuum-tightness and water-tightness.

The protrusions may instead be parts of two rings welded to the inner and outer pipes. Alternatively, the inner and outer pipe protrusions may be replaced by a full forged or cast steel bulkhead that connects the inner and outer pipes, which bulkhead has traversing longitudinal bores. After installation of the cables through the bores, the bores are sealed by injecting polymer material. Sealing can be performed before or after welding the bulkhead to inner and outer pipe sections.

The bulkhead or the protrusion of the outer pipe may also comprise bores and ports for injecting the polymer from outside the outer pipe rather than through the annulus. Ports are closed by welding plugs. If the bulkhead or the rings are of cast steel, an internal ring bore can be used as a manifold.

Either or both of the inner and outer pipes may be of composite material.

Thus, the invention provides a tight closure of the cross-section of a pipe-in-pipe annulus, wherein:
  at least one elongate element traverses a tight closure structure from one side to the other side; and
  hardening polymer material is injected into the tight closure structure to seal the tight closure, said polymer material being hardened after the elongate element is installed through the tight closure structure to ensure tightness to air and water.

The invention also provides a method for manufacturing a tight closure of the cross-section of a pipe-in-pipe annulus, comprising:
  installing at least one elongate element along an inner pipe of the pipe-in-pipe through a tight closure structure;
  inserting the inner pipe into an outer pipe; and
  closing the tight closure by injecting a flowable polymer material and then hardening said polymer material.

Reference has already been made to FIG. 1 of the appended drawings, which is a cut-away perspective view of a length of ETH PiP pipeline known in the prior art. In order that the invention may be more readily understood, reference will now be made, by way of example, to the remaining drawings in which.

Figure 1:
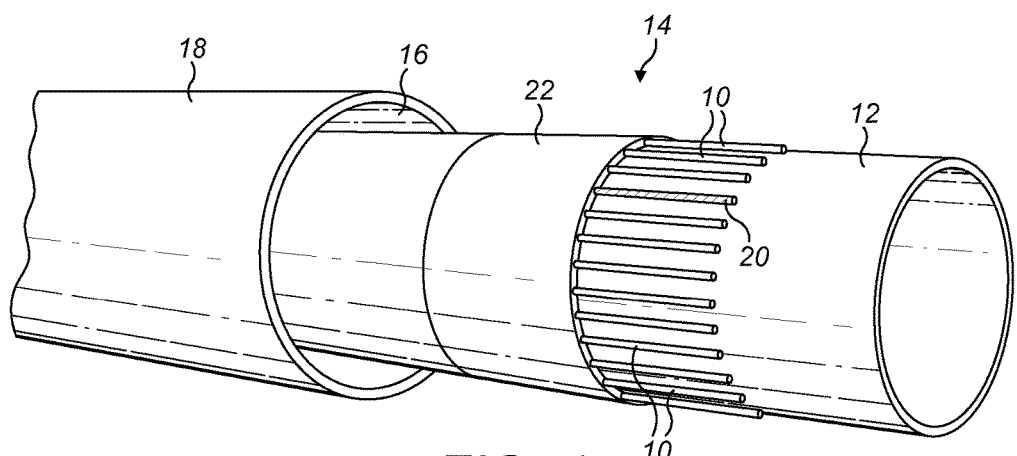

In FIGS. 2 to 15, like numerals are used for like parts. Thus, the various sealing arrangements of the invention described with reference to FIGS. 2 to 15 each comprise an inner flowline pipe 12 and an outer pipe 18 defining an annulus 16 in the space between them. Some of those drawings show electric heating elements 10 that extend longitudinally along the annulus 16 between the inner pipe 12 and the outer pipe 18. Some of those drawings also show an insulating layer 22 that overlays the heating elements 10.

As FIG. 1 shows, other longitudinally-extending elements such as fibre-optic data cables, power cables or cables for monitoring sensors may be positioned beside and between the heating elements 10. For ease of illustration, such other elements have been omitted from FIGS. 2 to 15 but they could of course be present in practical embodiments of the invention.

In each of FIGS. 2 to 15, provision is made for heating elements 10 in the annulus 16 around the inner pipe 12 to extend continuously through sealing arrangements that may be spaced along a pipeline. There is no need for additional electrical connections or to interrupt thermal management.

Figure 2:
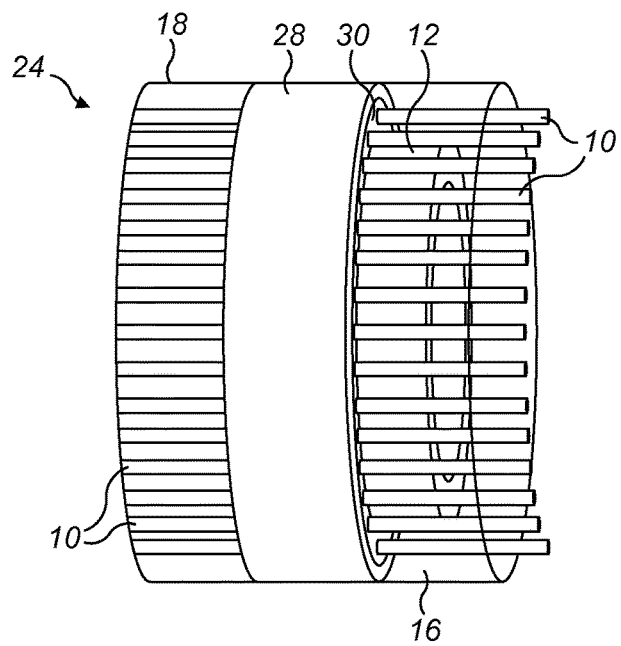
FIGS. 2 and 3 are schematic cut-away perspective views of alternative ETH PiP sealing arrangements in accordance with the invention.
Figure 3:
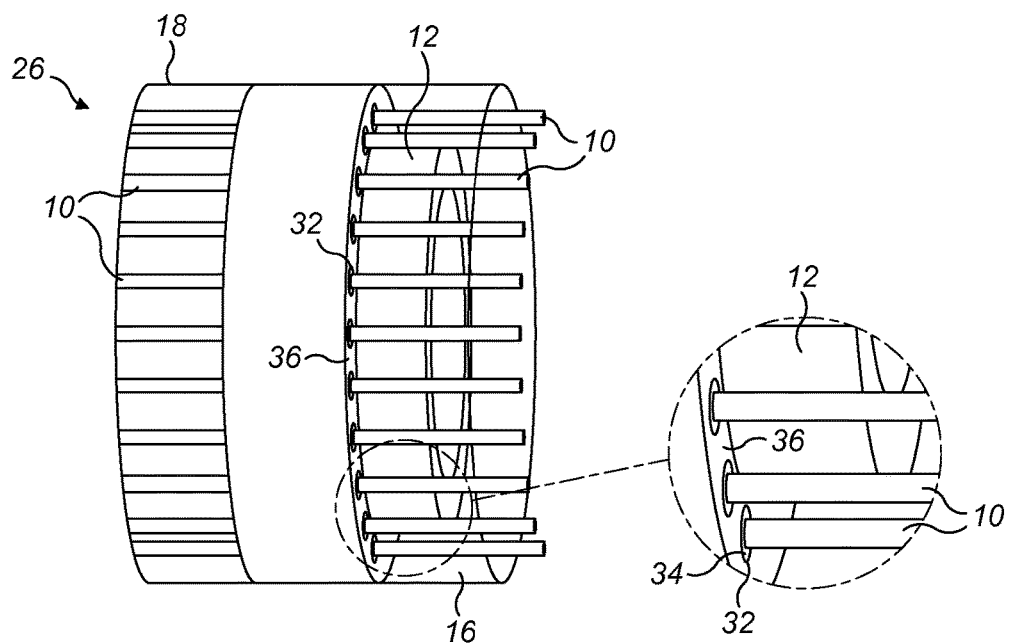

Turning firstly to the sealing arrangements 24, 26 of the invention shown in the simplified general views of FIGS. 2 and 3, circumferentially-spaced heating elements 10 extend longitudinally along the annulus 16 between the inner pipe 12 and the outer pipe 18. Insulating layers 22 have been omitted from these views for clarity; in any event, insulating layers 22 will be spaced apart or cut away at the location of the sealing arrangements 24, 26 to leave a gap for effective sealing.

In the sealing arrangement 24 shown in FIG. 2, the heating elements 10 extend beside each other through a circumferentially-continuous throat region 28 of the annulus 16. In the throat region 28, the radial width of the annulus 16 is restricted in comparison with the full radial width of the annulus 16 between the inner and outer pipes 12, 18. As a result, the radial width of the annulus 16 in the throat region 28 is only slightly greater than the thickness of the heating elements 10 that traverse the restriction.

The internal formations that define the throat region 28 may, for example, be shaped like those shown in FIGS. 4a to 4g, to be described later.

The throat region 28 is filled with an injection-moulded elastomeric filler that embeds the heating elements 10. The filler forms an annular filler mass 30 that is circumferentially continuous and that spans the annulus 16 from the inner pipe 12 to the outer pipe 18, thus being in conforming sealing contact with the heating elements 10 and with both pipes 12, 18 along longitudinally-extending contact interfaces.

The annular filler mass 30 separates and supports the heating elements 10, fully surrounding, conforming to and sealing against each of those elements 10. Optionally, the annular filler mass 30 may extend longitudinally beyond the radially-narrowest part of the throat region 28, for example to fill the full radial width of the annulus 16 between the inner and outer pipes 12, 18. This better engages the filler mass 30 in the throat region 30 and so helps to resist a large pressure differential between sections of the annulus 16 to each side of the throat region 30.

In contrast, in the sealing arrangement 26 shown in FIG. 3, the circumferentially-spaced heating elements 10 extend beside each other through respective circumferentially-spaced, longitudinally-extending bores 32 disposed between the inner and outer pipes 12, 18. The internal diameter of each bore 32 is less than the full radial width of the annulus 16 between the inner and outer pipes 12, 18, and is only slightly greater than the thickness of the heating element 10 that the bore 32 contains. Again, therefore, the radial width of the annulus 16 is restricted in the bores in comparison with the full radial width of the annulus 16 between the inner and outer pipes 12, 18.

The small clearance around each heating element 10 within its bore 32 is filled with an injection-moulded tubular body of elastomeric filler 34 that embeds the heating element 10. Thus, the heating elements 10 are separately embedded in the bodies of filler 34 in their respective bores 32. However, it is possible for the bodies of filler 34 to extend longitudinally beyond the bores 32 and optionally to fill the full radial width of the annulus 16 between the inner and outer pipes 12, 18. Thus, it is possible for the bodies of filler 34 to be part of a common filler mass that extends into the bores 32 and that is joined at longitudinally-offset positions outside the bores 32. Again, this better engages the filler mass relative to the bores 32 and so helps to resist a large pressure differential between sections of the annulus 16 to each side of the bores 32.

In effect, the circumferentially-spaced bores 32 of the sealing arrangement 26 shown in FIG. 3 define a throat region that is like the throat region 28 of FIG. 2 apart from being circumferentially discontinuous by virtue of circumferentially-spaced walls 36 that separate the bores 32.

The internal formations that define the bores 32 may, for example, be shaped like those shown in FIGS. 5a to 5f, to be described later.

A preferred example of a flowable filler material that is suitable for the sealing arrangements 24, 26 of FIGS. 2 and 3 is a thermoplastic material such as polypropylene, although a thermoset material such as polyurethane or a polyimide would be possible instead.

Preferred filler materials are engineered synthetic polymers that have thermally-insulating qualities to avoid thermal bridging across the annulus 16 despite there being a gap in the insulating layer 22 to enable effective sealing. In this respect, the injected polymer surrounds, embeds and seals against the heating elements 10 and seals against the surrounding metal or composite surfaces where the insulating layer 22 is not present, thus creating a gas-tight, vacuum-tight and water-tight seal where a section of the annulus 16 ends.

Preferred polymer materials can withstand the elevated surface temperatures that are typical of a flowline or steel or other material, which may be in excess of 100° C. Preferred polymer materials must also remain sufficiently visco-elastic once cured or hardened to perform the mechanical duty of sealing while accommodating thermal expansion of the pipes and deformation of the pipes such as ovalisation. Particular advantages of using a resilient polymeric filler material to seal the annulus 16 are that it removes the need for penetrators and can better comply with deformation due to ovalisation when spooling a pipe onto a reel.

FIGS. 4a to 14 show various sealing arrangements of the invention that embody the principles of the embodiments shown in general terms in FIGS. 2 and 3.

FIGS. 4a to 4g are a sequence of views showing one way to assemble an ETH PiP sealing arrangement 24 of the invention as shown in FIG. 2. As noted above and as best shown in FIG. 4d, the sealing arrangement 24 is characterised by a throat region 28 at which the annulus 16 is radially narrowed and through which the heating elements 10 extend longitudinally. The throat region 28 extends continuously around the circumference of the annulus 16.

Figure 4A:
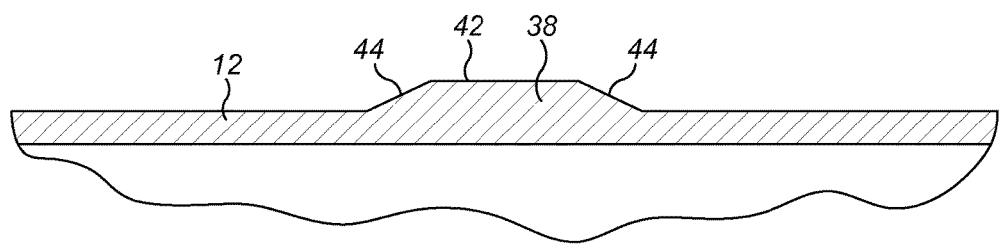
FIGS. 4a to 4g are a sequence of schematic sectional views showing the manufacture of an ETH PiP sealing arrangement of the invention, FIGS. 4a to 4d and 4f being longitudinal sections and FIGS. 4e and 4g being cross-sections on line A-A of FIG. 4d and line B-B of FIG. 4f respectively.
Figure 4B:
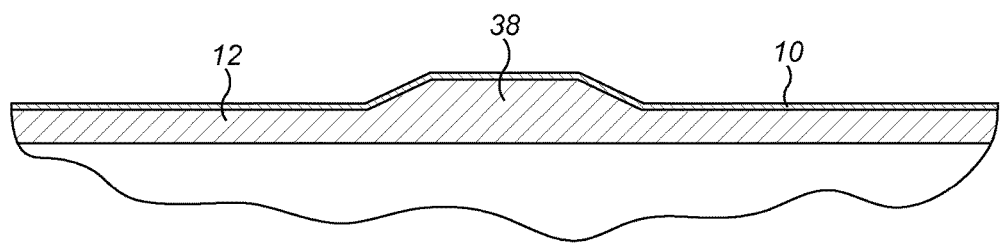
Figure 4C:
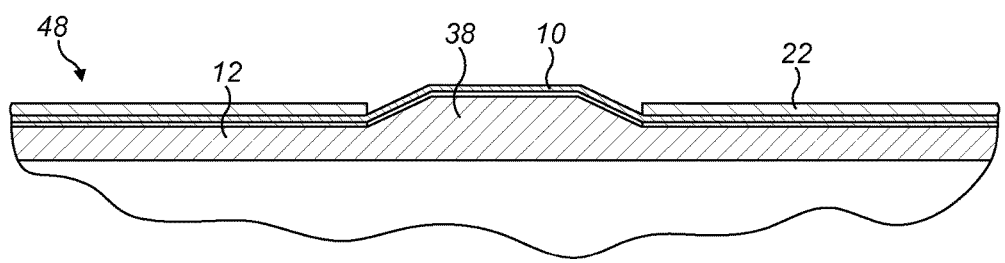
Figure 4D:
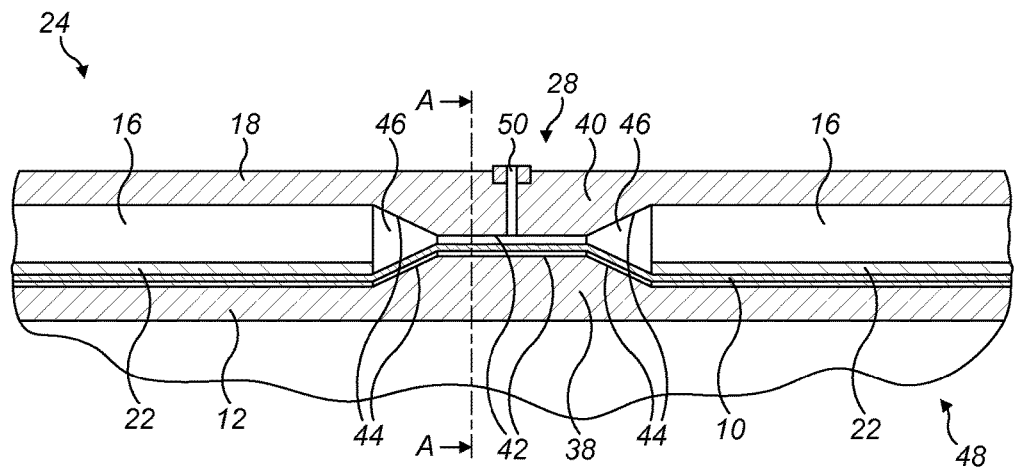

FIG. 4d shows that the throat region 28 is defined by opposed circumferential projections 38, 40 that extend into the annulus 16 to narrow the annulus 16. The projections 38, 40 are rotationally symmetrical about the common central longitudinal axis of the inner and outer pipes 12, 18.

Specifically, an inner projection 38 of the inner pipe 12 projects radially outwardly into the annulus 16 toward the outer pipe 18; and a radially-opposed outer projection 40 of the outer pipe 18 projects radially inwardly into the annulus 16 toward the inner pipe 12. Longitudinally-extending lands 42 of the inner and outer projections 38, 40 confront each other across a narrow gap to define the throat region 28. The lands 42 are substantially parallel to the central longitudinal axis of the pipes 12, 18.

For simplicity, the inner and outer projections 38, 40 are shown here as being integral with the inner and outer pipes 12, 18. Integral projections 38, 40 may be particularly apt where either of the inner and outer pipes 12, 18 is of composite material. However, other embodiments to be described later will show how separate inner and outer projections 38, 40 may be incorporated into, or attached to, the inner and outer pipes 12, 18.

In longitudinal section as shown in FIG. 4a, the inner projection 38 comprises inclined frusto-conical shoulders 44 that extend from the inner pipe 12 to respective ends of the longitudinally-extending face or land 42. As can be appreciated from FIG. 4d, the outer projection 40 on the outer pipe 18 is a mirror image of the inner projection 38 and so has corresponding features.

In this example, the projections 38, 40 are generally symmetrical about a central transverse plane that is orthogonal to the central longitudinal axis of the pipes 12, 18 and that bisects the projections 38, 40. Thus, the shoulders 44 face away from each other in opposite longitudinal directions and with equal but opposite inclinations.

FIG. 4d shows that in the assembled ETH PiP sealing arrangement 24, the lands 42 of the inner and outer projections 38, 40 confront each other in parallel spaced concentric relation. The radially-opposed shoulders 44 of the inner and outer projections 38, 40 define longitudinally-tapering annular spaces 46 at each end of the throat region 28.

To start the assembly sequence, FIG. 4a shows a wall of the inner pipe 12 including the inner projection 38, which in turn comprises a land 42 and inclined shoulders 44.

Next, FIG. 4b shows one of several longitudinally-extending heating elements 10 laid along the exterior of the inner pipe 12 to surmount and traverse the inner projection 38. Then, FIG. 4c shows an insulating layer 22 laid around the inner pipe 12 on top of the heating elements 10 to complete an inner pipe assembly 48. The insulating layer 22 is interrupted in the longitudinal direction to accommodate the inner projection 38. In this example, longitudinally-spaced portions of the insulating layer 22 terminate at the base of the shoulders 44.

Figure 4E:
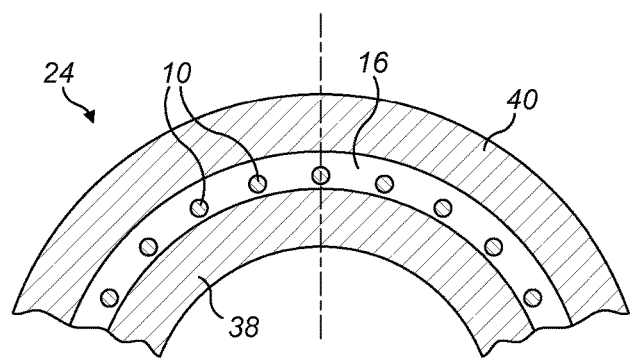

FIGS. 4d and 4e show the inner pipe assembly 48 placed into the outer pipe 18 to create the annulus 16, while bringing the inner and outer projections 38, 40 into longitudinal alignment to create the throat region 28 of the annulus 16. For example, the inner pipe assembly 48 may be inserted telescopically into the outer pipe 18. Alternatively, the outer pipe 18 may be assembled and fabricated around the inner pipe assembly 48.

Figure 4F:
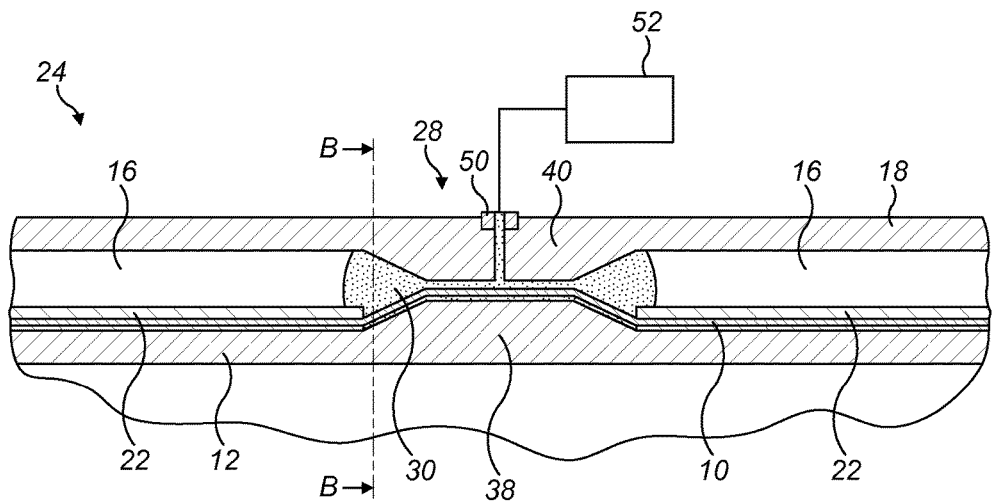
Figure 4G:
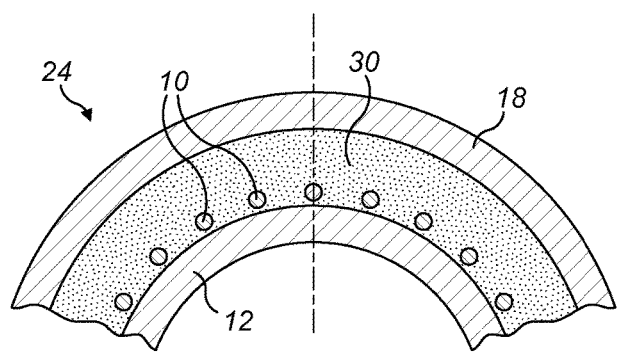

It will be apparent from FIG. 4d that the wall of the outer pipe 18 is penetrated by at least one radially-extending port 50. The port 50 may be one of multiple ports 50 distributed in angularly-spaced positions around the circumference of the outer pipe 18. The port 50 is aligned longitudinally with the outer projection 40 to communicate with the annulus 16 in the throat region 28, specifically with the narrow annular gap between the lands 42 of the inner and outer projections 38, 40. FIGS. 4f and 4g show the purpose of the port 50, which is to admit liquid filler material into the throat region of the annulus 16 under pressure from injection moulding apparatus 52. The filler material flows axially and circumferentially from the port 50 to fill the throat region 28 with a circumferentially-continuous annular filler mass 30 that cures and hardens to embed the heating elements 10. The port 50 can then be disconnected from the injection moulding apparatus 52 and closed with a welded or threaded filler plug.

The filler mass 30 may be confined to the narrow annular gap between the lands 42 of the inner and outer projections 38, 40. Preferably, however, the filler mass 30 oozes out of that gap to extend and expand into the tapering annular spaces 46 between the radially-opposed shoulders 44 of the inner and outer projections 38, 40. This better engages the filler mass 30 in the throat region 30. For example, FIG. 4f shows the filler mass 30 extending to the base of the shoulders 44. There, the filler mass 30 meets the insulating layer 22 to maintain continuous thermal insulation along the length of the pipeline.

Turning next to the sequence of views in FIGS. 5a to 5f, these show one way to assemble an ETH PiP sealing arrangement 26 of the invention as shown in FIG. 3. As noted above and as best shown in FIG. 5f, the sealing arrangement 26 is characterised by the heating elements 10 being separately embedded in respective bodies of filler 34 in respective longitudinally-extending bores 32.

In the example shown in FIGS. 5a to 5f, the sealing arrangement 26 comprises a cast steel bulkhead 54 that is butt-welded in series with the inner and outer pipes 12, 18. Once welded into that position, the bulkhead 54 becomes integrated with the inner and outer pipes 12, 18 as an extension of the pipe walls.

Figure 5A:
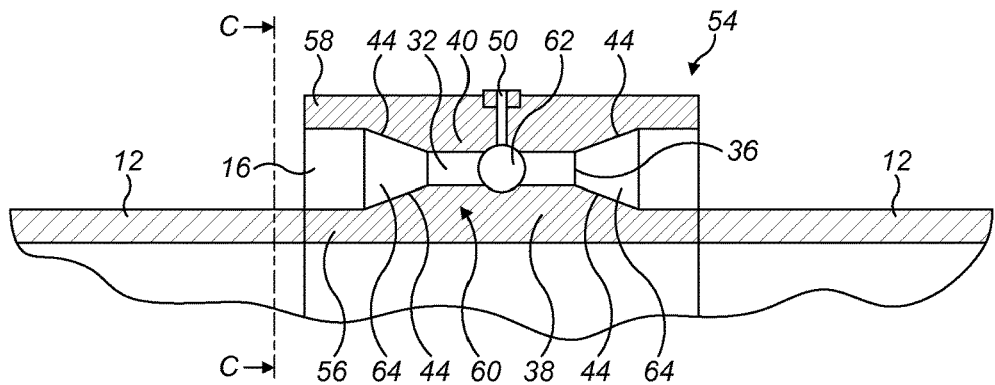
FIGS. 5a to 5f are a sequence of schematic sectional views showing the manufacture of an alternative ETH PiP sealing arrangement of the invention, FIGS. 5a and 5c to 5e being longitudinal sections and FIGS. 5b and 5f being cross-sections on line C-C of FIG. 5a and line D-D of FIG. 5e respectively.
Figure 5B:
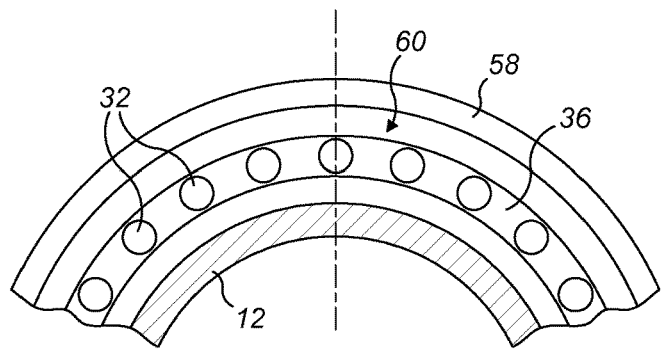
Figure 5C:
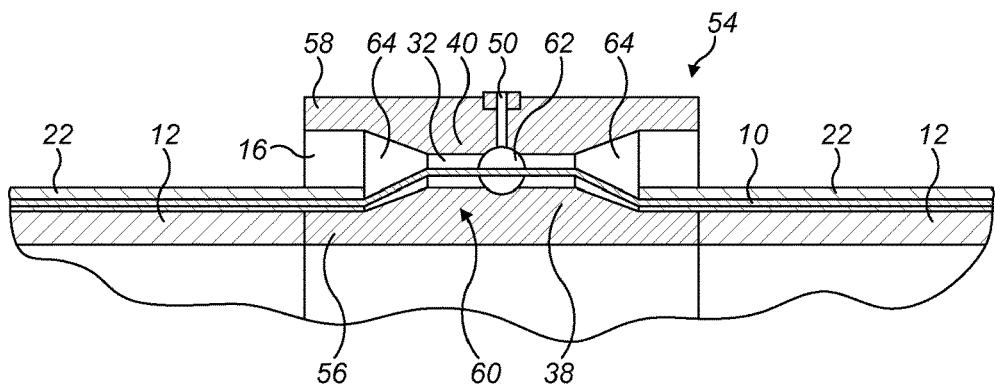
Figure 5D:
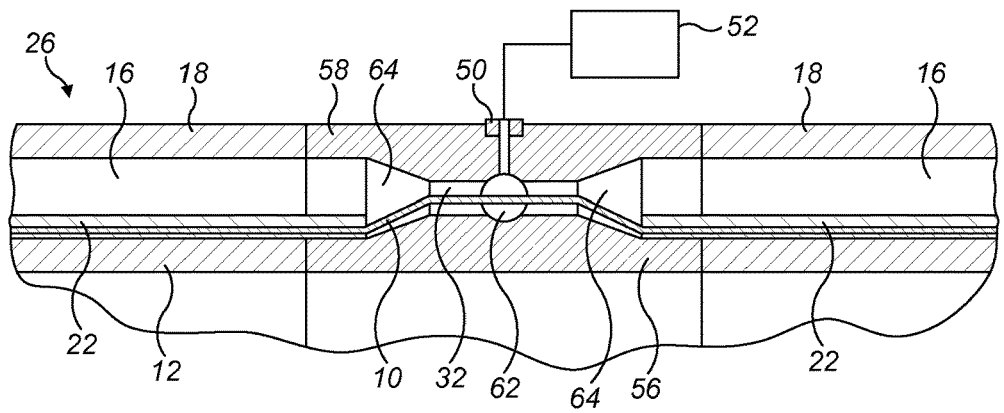
Figure 5E:
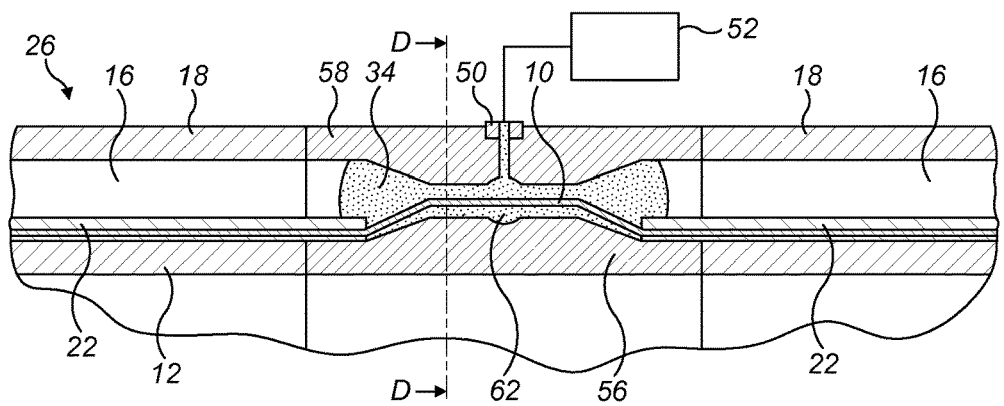
Figure 5F:
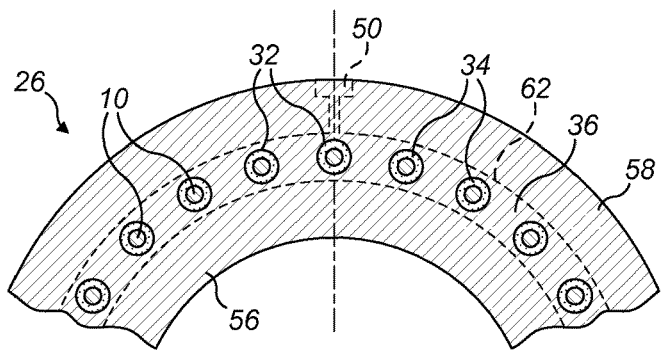

Thus, the bulkhead 54 comprises concentric inner and outer walls 56, 58 that are spaced to align with the inner and outer pipes 12, 18 respectively and to continue the annulus 16 between them. FIGS. 5a, 5b and 5c show the bulkhead 54 welded to two sections of the inner pipe 12 via the inner wall 54. FIGS. 5d, 5e and 5f show the addition of two sections of the outer pipe 18, welded to the outer wall 58.

In this embodiment, the inner and outer projections 38, 40 extend radially into the annulus 16 from the inner and outer walls 56, 58 respectively. In this respect, the inner and outer walls 56, 58 equate to the inner and outer pipes 12, 18 of the preceding embodiment. However, the inner and outer projections 38, 40 are now joined integrally by a central intermediate ring 60 through which the bores 32 extend longitudinally, leaving walls 36 of the central ring 60 between each adjacent pair of bores 32 as best shown in FIG. 5b.

The bores 32 are connected by a circumferential ring bore 62 that encircles the inner projection 38 and aligns with the port 50. The ring bore 62 serves as a manifold that effects fluid communication between the port 50 and all of the bores 32.

Like the preceding embodiment, the inner and outer projections 38, 40 each comprise inclined frusto-conical shoulders 44 that extend into the annulus 16 from the respective inner and outer walls 56, 58. In this case, the shoulders 44 extend to respective ends of the central ring 60, so that the radially-opposed shoulders 44 define longitudinally-tapering annular spaces 64 at each end of the central ring 60. The shoulders 44 narrow the annulus 16 from its full width so that the central ring 60, and hence the bores 32 that penetrate the central ring 60, are radially narrower than the full width of the annulus 16.

As the central ring 60 terminates longitudinally inboard of the spaces 64, the spaces 64 are circumferentially continuous. However, in a variant, the central ring 60 and the bores 32 could extend into the spaces 64, making the spaces 64 circumferentially discontinuous.

To start the assembly sequence, FIGS. 5a and 5b show the bulkhead 54 welded to two sections of the inner pipe 12 via the inner wall 54. Next, FIG. 5c shows one of several longitudinally-extending heating elements 10 laid on the exterior of the inner pipe 12 and threaded through a bore 32 of the bulkhead 54. FIG. 5c also shows an insulating layer 22 laid around the inner pipe 12 on top of the heating elements 10. Again, the insulating layer 22 is interrupted in the longitudinal direction to accommodate the inner projection 38 of the bulkhead 54. In this example, longitudinally-spaced portions of the insulating layer 22 extend a short distance into the bulkhead 54 to terminate at the base of the shoulders 44.

FIGS. 5d and 5e show sections of the outer pipe 18 welded to the bulkhead 54 around the corresponding sections of the inner pipe 12 to create the annulus 16, which contains the heating elements 10 and the insulating layer 22.

FIG. 5e shows a liquid or other flowable filler material injected through the port 50, through the ring bore 62 and into the bores 32 under pressure from injection moulding apparatus 52. The filler material flows circumferentially from the port 50 to fill the ring bore 62 and then flows axially into the bores 32 around the heating elements 10. This creates multiple tubular filler bodies 34, one in each bore 32, that cure and harden to embed the respective heating elements 10. As in the preceding embodiment, the port 50 can then be disconnected from the injection moulding apparatus 52 and closed with a welded or threaded filler plug.

The filler bodies 34 may be confined to the bores 32. Preferably, however, the filler material oozes out of the bores 32 to extend and expand into the tapering annular spaces 64 between the radially-opposed shoulders 44 of the inner and outer projections 38, 40. This better engages the filler bodies 34 with the bores 32. For example, FIG. 5e shows the filler bodies 34 merging into a circumferentially-continuous mass in the spaces 64, which mass extends to the base of the shoulders 44. There, the filler material meets the insulating layer 22 to maintain continuous thermal insulation along the length of the pipeline.

In variants of the sequence shown in FIGS. 5c to 5e, injection of filler material can be performed before welding sections of the outer pipe 18 and/or the inner pipe 12 to the bulkhead 54.

Figure 6:
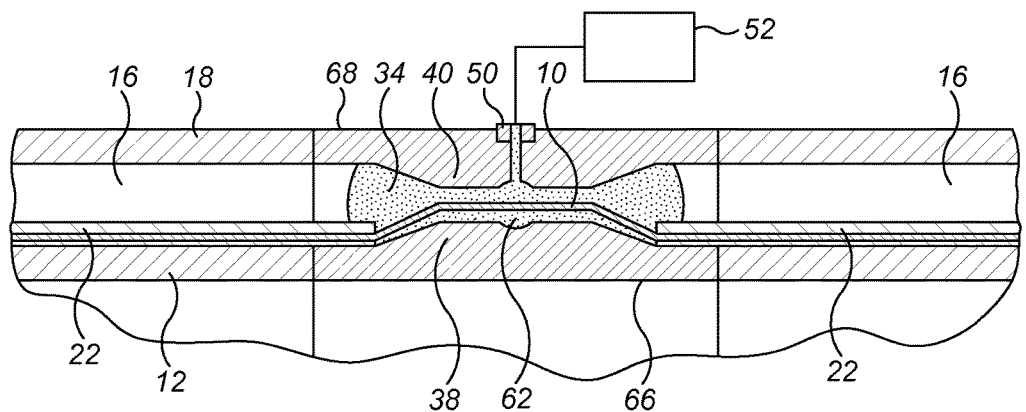
FIGS. 6 to 10 are schematic longitudinal sectional views of other ETH PiP sealing arrangements of the invention.

FIG. 6 shows a variant in which the bulkhead 54 is replaced by separate inner and outer rings 66, 68 that are separately butt-welded to the inner and outer pipes 12, 18 respectively. Thus, FIG. 6 shows the inner ring 66 welded between two sections of the inner pipe 12 and the outer ring 68 welded between two sections of the outer pipe 18. The inner and outer rings 66, 68 may be machined, forged, cast or moulded.

Once assembled in this way, inner and outer projections 38, 40 extend radially into the annulus 16 from the inner and outer rings 66, 68 respectively. The projections 38, 40 may abut or approach each other radially to define longitudinal bores 32 and a ring bore 62 between them as shown, supplied with liquid filler material from an injection moulding apparatus 52 via a port 50. In that case, the longitudinal bores 32 and the ring bore 62 may be partially defined by grooves in the inner and outer projections 38, 40 that are brought together in mutual opposition to define the full bores 32, 62. Examples of this approach will be described below in more detail with reference to FIGS. 11a to 14. Alternatively, the projections 38, 40 may approach each other radially to define a circumferentially-continuous throat region like that shown in FIGS. 4a to 4g.

Figure 7:
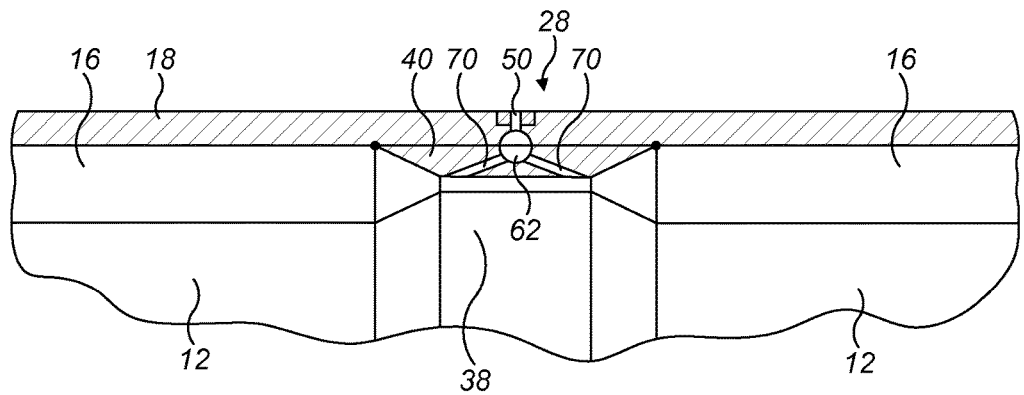

FIG. 7 shows that inner and/or outer projections 38, 40 may be separate from and attached to the inner and/or outer pipes 12, 18, for example by welding or bonding. The inner and/or outer projections 38, 40 may be machined, forged, cast or moulded. It will be evident to the skilled reader that the inner and/or outer projections 38, 40 could instead be similarly attached to inner and/or outer rings 66, 68 like those shown in FIG. 6 or indeed to a bulkhead 54 like that shown in FIGS. 5a to 5f.

In this example, the inner and outer projections 38, 40 approach each other radially to define a circumferentially-continuous throat region 28 like that shown in FIGS. 4a to 4g. However, the projections 38, 40 could instead abut or approach each other radially to define longitudinal bores and/or a ring bore between them as in FIGS. 5a to 5f.

FIG. 7 also shows that a ring bore 62 may be contained in the outer projection 40 or between the outer pipe 18 and the outer projection 40. In this example, the ring bore 62 is partially defined by circumferential grooves in the outer pipe 18 and the outer projection 40 that are brought together in mutual opposition to define the full ring bore 62.

As before, the ring bore 62 communicates with the port 50 in the outer pipe 18 to receive liquid filler material. In this example, the ring bore 62 also communicates with longitudinally-spaced channels 70 to distribute the filler material into the circumferential gap or into longitudinal bores between the inner and outer projections 38, 40. The channels 70 may be distributed in angularly-spaced positions around the circumference of the ring bore 62 and may be arranged singly or in groups such as pairs.

Figure 8:
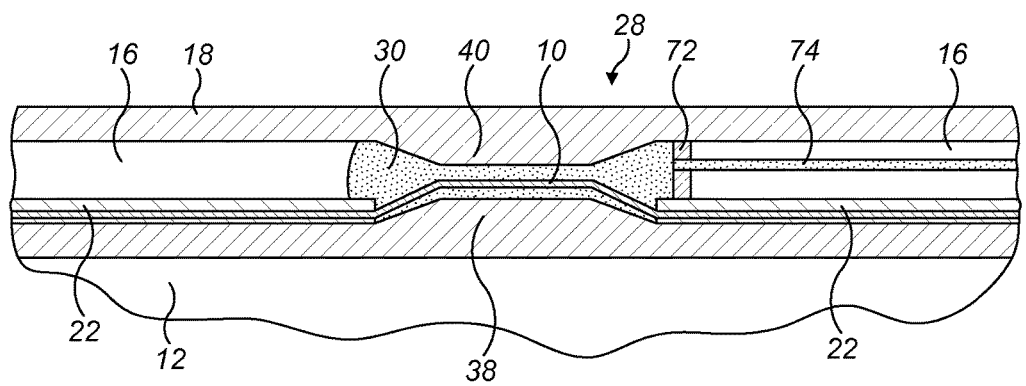

Turning next to FIG. 8, this shows that it is not essential to introduce liquid filler material via a port 50 as in the preceding embodiments. Here, instead, the liquid filler material is introduced via a filler head 72 that is supplied under pressure by a hose or pipe 74 extending along the annulus 16 from an external injection moulding apparatus, which is not shown in this diagram.

FIG. 8 shows the filler head 72 positioned in a section of the annulus 16 on one side of the throat region 28. A filler mass 30 of liquid filler material has been forced under pressure from the filler head 72 through the throat region 28 between the inner and outer projections 38, 40. The filler mass 30 therefore surrounds and embeds heating elements 10 extending through the throat region 28. Optionally, as shown, the filler mass 30 also extends into the section of annulus 16 on the other side of the throat region 28.

Figure 9:
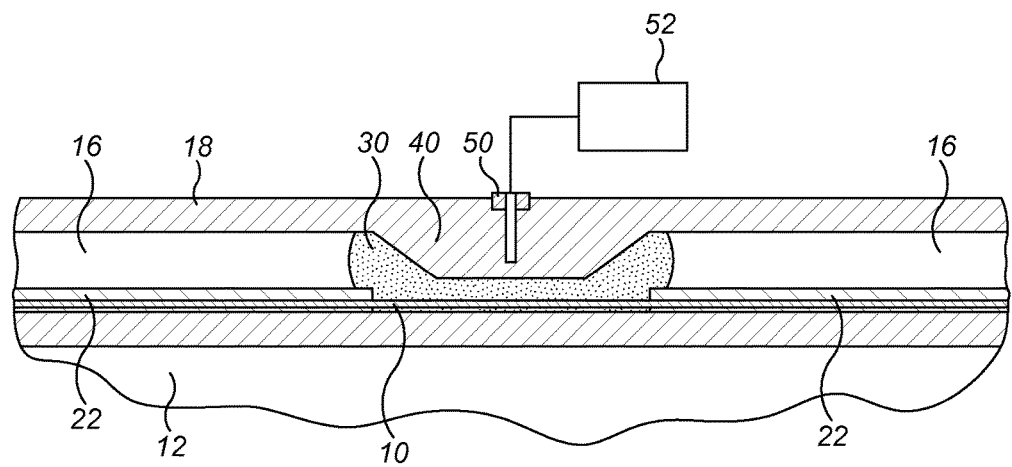

FIG. 9 shows that it is not essential for there to be symmetry between inner and outer projections 38, 40 to define the radially-narrowed gap through which the heating elements 10 extend. Indeed, FIG. 9 shows that it is not essential for there to be an inner projection 28 at all. Instead, FIG. 9 shows the heating elements 10 lying against the straight-sided exterior of the inner pipe 12. A radially-enlarged outer projection 40 is shown facing a longitudinally-extending gap in the insulating layer 22 that lies over the heating elements 10. The heating elements 10 span the gap. An injection moulding apparatus 52 has injected a filler mass 30 through a port 50 to fill the gap, embedding the heating elements 10 and maintaining thermal insulation despite the interruption of the insulating layer 22.

Liquid or other flowable filler material may be distributed circumferentially around a sealing arrangement by means other than a ring bore. For example, FIG. 10 shows an annular external channel 76 that is clamped around and sealed to the outer pipe 18.

The channel 76 communicates with multiple radially-extending ports 50 distributed in angularly-spaced positions around the circumference of the outer pipe 18. The channel receives liquid filler material from an injection moulding apparatus 52 and distributes that material to the ports 50. The ports 50 then direct the liquid filler material into the gap between the inner and outer projections 38, 40, where it hardens to form a filler mass 30 that embeds the heating elements 10 extending longitudinally through the gap.

Figure 10:
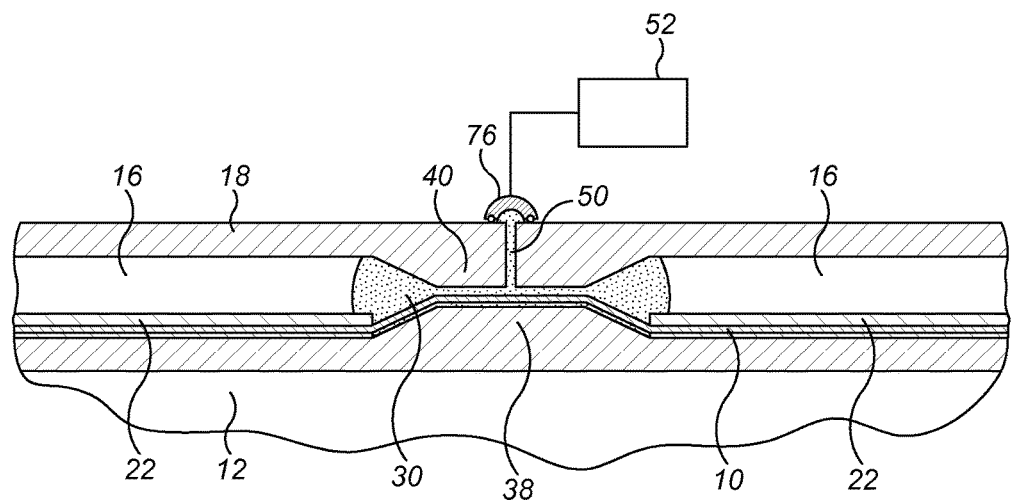

Again, whilst a circumferentially-continuous gap is shown in FIGS. 8 to 10, the same principles may be applied to variants in which the heating elements 10 are housed in longitudinal bores.

Figure 11A:
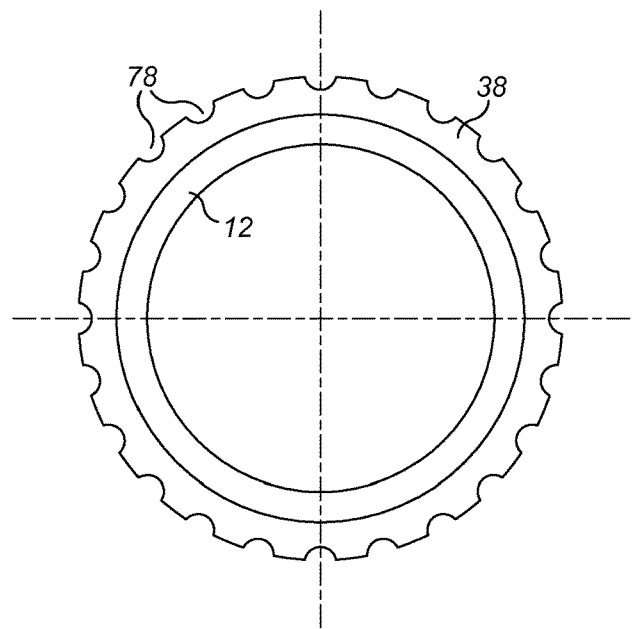
FIGS. 11a and 11b are schematic cross-sectional views, FIG. 11a showing an inner pipe and FIG. 11b showing an outer pipe for use together in another ETH PiP sealing arrangement of the invention as shown in FIG. 12.
Figure 11B:
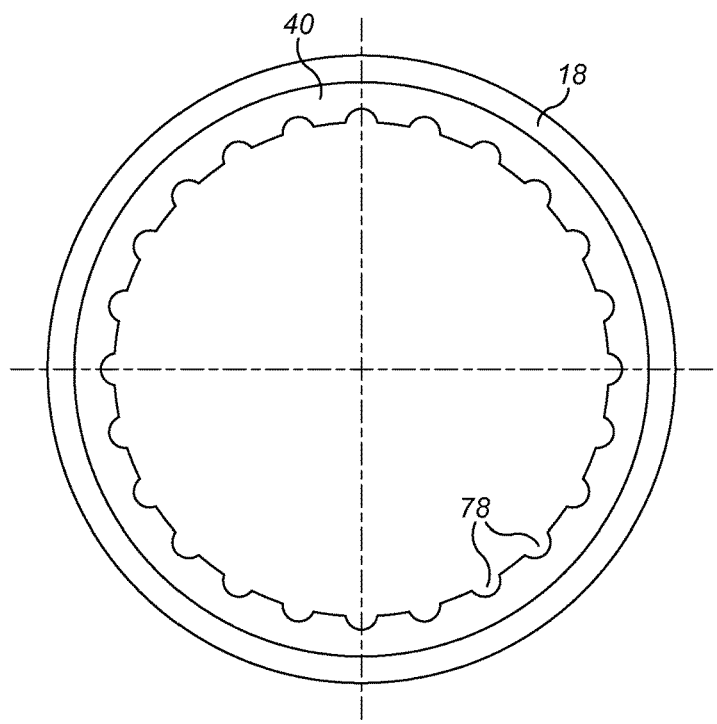

It has been mentioned above that the inner and outer projections 38, 40 may be shaped to define longitudinally-extending bores 32 between them when the projections 38, 40 are brought together to abut or approach each other radially. In this respect, FIGS. 11a and 11b show an inner projection 38 on an inner pipe 12 and an outer projection 40 on an outer pipe 18 respectively. Matching circumferential arrays of longitudinally-extending angularly-spaced grooves 78 are disposed around the outer face of the inner projection 38 and around the inner face of the outer projection 40.

Figure 12:
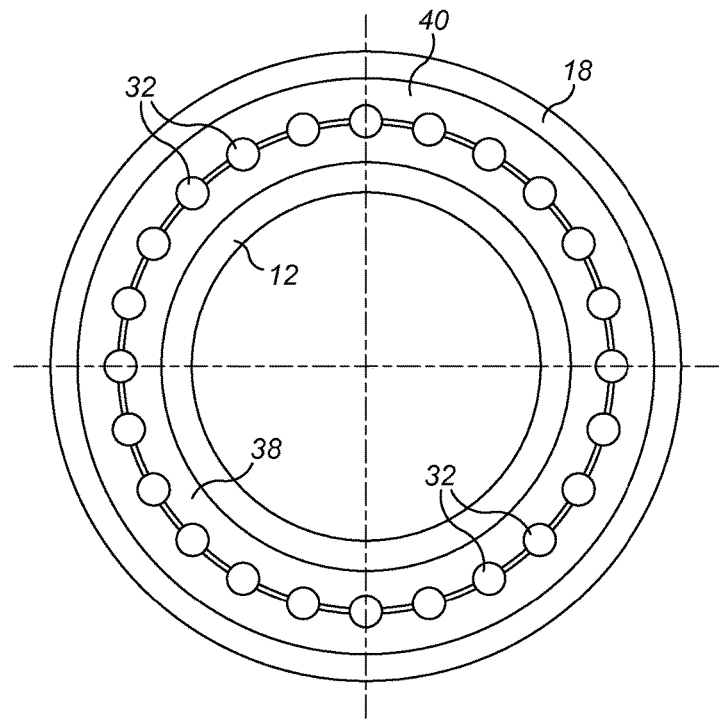
FIG. 12 is a schematic cross-sectional view showing the inner and outer pipes of FIGS. 11a and 11b respectively assembled together to form an ETH PiP sealing arrangement.

As FIG. 12 shows, the internal diameter of the outer projection 40 slightly exceeds the external diameter of the inner projection 38, so that the inner pipe 12 can fit concentrically within the outer pipe 18 when the inner and outer projections 38, 40 are in longitudinal alignment. The grooves 78 are brought together in mutual opposition and radial alignment to define a circumferential array of longitudinally-extending angularly-spaced bores 32 as shown in FIG. 12.

Figure 13:
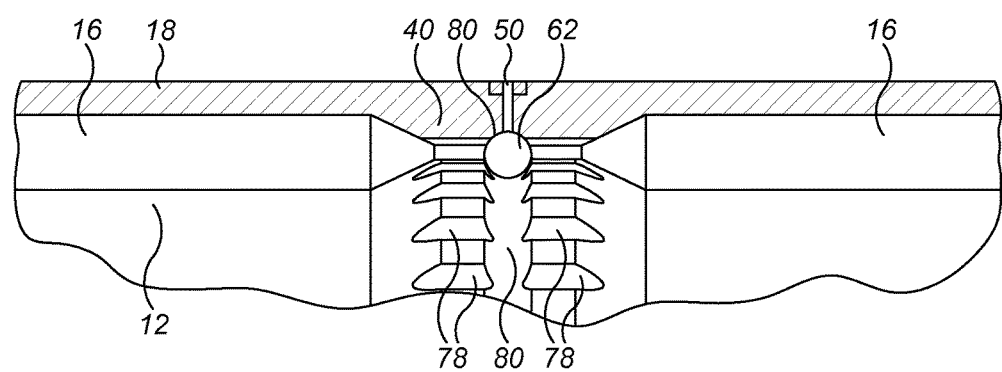
FIGS. 13 and 14 are schematic longitudinal sectional views of variants of the ETH PiP sealing arrangement shown in FIG. 12.
Figure 14:
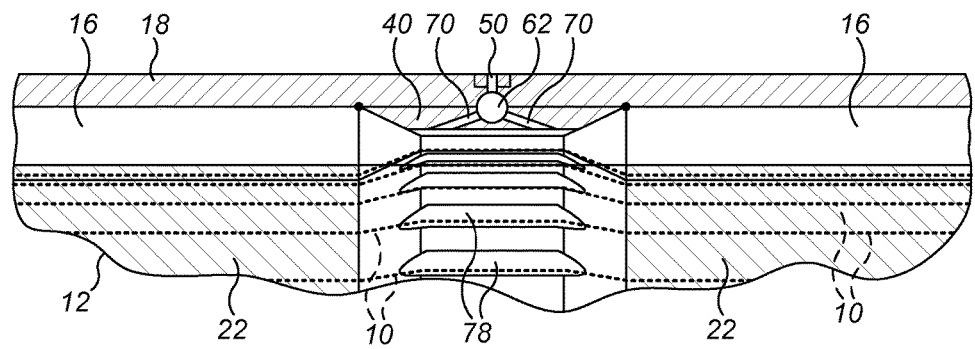

FIGS. 13 and 14 show different arrangements to provide for a flow of liquid filler material into the array of bores 32 shown in FIG. 12.

In the arrangement shown in FIG. 13, opposed circumferential grooves 80 encircle the inner and outer projections 38, 40 to define a circumferential ring bore 62 when the inner and outer pipes 12, 18 are brought together. A port 50 communicates with the ring bore 62. This is akin to the embodiment shown in FIGS. 5a to 5f but omits the separate bulkhead 54 of that embodiment.

In FIG. 13, the circumferential grooves 80 intersect the longitudinal grooves 78. Thus, the ring bore 62 defined by longitudinal alignment of the opposed circumferential grooves 80 connects the port 50 to the bores 32, which are defined in turn by radial alignment of the opposed longitudinal grooves 78.

FIG. 14 shows a variant that combines features of FIG. 7 with features of FIG. 12. Thus, the inner and/or outer projections 38, 40 are separate components that are welded to the inner and/or outer pipes 12, 18. Also, a ring bore 62 is partially defined by circumferential grooves in the outer pipe 18 and the outer projection 40 that are brought together in mutual opposition. The ring bore 62 communicates with a port 50 in the outer pipe 18 to receive liquid filler material. The liquid filler material is distributed into the longitudinal bores 32 via channels 70 spaced angularly around the circumference of the ring bore 62.

FIG. 14 also shows, in dotted lines, longitudinally-extending circumferentially-spaced heating elements 10. The heating elements 10 lie under an insulating layer 22 that is interrupted by the inner projection 38, where the heating elements 10 can be seen following the longitudinal grooves 78 that form the bores 32 seen in FIG. 12.

Figure 15:
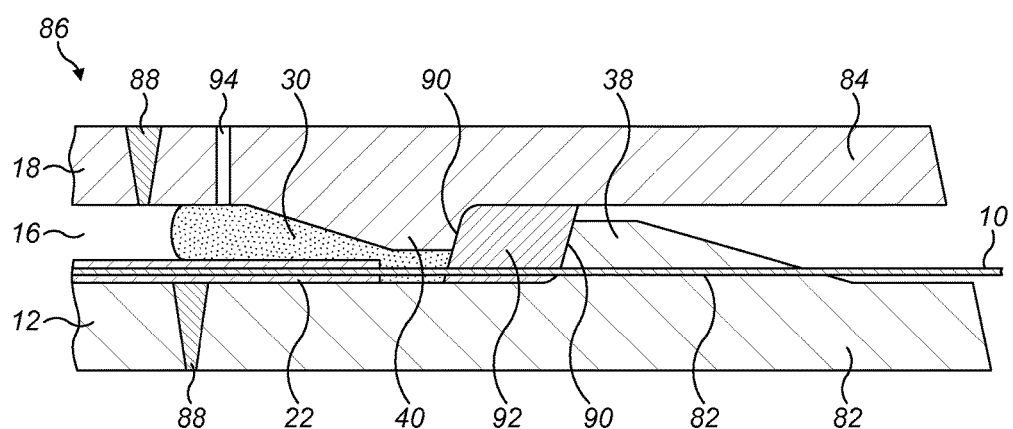
FIG. 15 is a schematic longitudinal sectional view of a bulkhead assembly comprising a sealing arrangement in accordance with the invention.

Finally, FIG. 15 shows inner and outer forged rings 82, 84 respectively of a bulkhead assembly 86. The rings 82, 84 are in concentric relation and are attached by butt welds 88 to ends of inner and outer pipes 12, 18 respectively. The annulus 16 between the pipes 12, 18 also extends between the rings 82, 84. The other ends of the rings 82, 84 are shown in FIG. 15 ready for welding to an adjoining pipe length or to an intermediate or termination structure of a pipeline such as a pipeline accessory.

In this embodiment, inner and outer projections 38, 40 that are integral with the rings 82, 84 are spaced longitudinally from each other and overlap radially with each other to interlock. Opposed interlocking shoulders 90 of the projections 38, 40 bear against an insulating polymeric spacer ring 92 that fills the longitudinal gap between the confronting shoulders 90. The spacer ring 92 provides a mechanical interface between the projections 38, 40 to resist relative longitudinal movement between the inner and outer pipes 12, 18.

The inner projection 38 is not wholly continuous around the full circumference of the annulus 16, being penetrated by longitudinal bores 32 to accommodate heating elements 10 that are laid on the outside of the inner pipe 12. The spacer ring 92 accommodates the heating elements 10 in channels on the radially inner side of the spacer ring 92, aligned with the bores 32. In this way, the heating elements 10 extend through the inner projection 38 and also through the abutting spacer ring 92.

A polymer is injected into the annulus 16 through a port 94 that penetrates a wall of the outer ring 84. Unlike the ports 50 of previous embodiments, the port 94 does not extend through the outer projection 40; instead, the port 94 is longitudinally offset from the outer projection 40. However, the port 94 still communicates with the restriction of the annulus 16 defined by the outer projection 40, so that the sealing mass 30 extends into, and fills all of the remaining space in, that restriction.

The injected polymer conforms with and seals against the features in the annulus 16 and hardens to form a sealing mass 30. The sealing mass 30 separates the sealing function from the function of mechanical resistance, which is performed by the spacer ring 92.

In the bulkhead assembly 86 in FIG. 15, the sealing mass 30 is shown sealed against one side of the spacer ring 92 and around the heating elements 10. The insulating layer 22 is cut back from the spacer ring 92 to leave a gap between the end of the insulating layer 22 and the spacer ring 92 where the inner ring 82 is exposed. There, the sealing mass 30 seals against the exposed surface of the inner ring 82 and the opposed surface of the outer projection 40, and surrounds and embeds the heating elements 10, thus creating a gas-tight seal at an end of the annulus 16.

Various assembly methods can be used to make sealing arrangements of the invention. One example starts with sliding an outer pipe string relative to an inner pipe string so that the inner pipe string protrudes from the outer pipe string. Then, the following operations can be performed, albeit that not all of these operations must necessarily take place in the following order:

welding an inner ring comprising at least one inner projection to the inner pipe string;

passing heating elements over the inner projection or through grooves, bores or other openings in the inner projection;

wrapping a layer of thermal insulation material around the inner pipe string over the heating elements;

assembling or otherwise placing an outer ring comprising at least one outer projection around the inner ring;

welding the outer ring to the outer pipe string; and injecting a flowable, settable filler material into a gap or bore around the heating elements between the inner and outer projections.

It will be apparent that many other variations are possible without departing from the inventive concept. For example, either or both of the inner and outer projections may be continuous around the full circumference of the annulus. Alternatively, either or both of the inner and outer projections may be discontinuous circumferentially, being interrupted or penetrated by gaps, grooves or holes to accommodate longitudinal heating elements laid on the outside of the inner pipe. Indeed, either or both of the projections may be interrupted circumferentially to the extent that the projection comprises a circumferential array of angularly-spaced teeth.

Ring bores are only one example of channels that communicate between the or each port and the gaps or bores. Sealing arrangements of the invention may comprise any number of ports or channels leading to the gaps or bores between the inner and outer projections. There may be any number of bores per port or channel; similarly, a channel like a ring bore may communicate with any number of bores.

A flowable polymer material may be poured through a port in a casting process rather than being injected under pressure. Mould plates may be inserted into the annulus to define the boundary of a moulding cavity.

As the filler material will flow into and close every bore with a sealing mass irrespective of the presence or otherwise an elongate element such as a heating wire, not every bore needs to contain such an element. Similarly, but more generally, it is not essential that elongate elements such as heating wires are distributed equally around the full circumference of the inner pipe.

The invention claimed is:

1. An electrically trace-heated pipe-in-pipe structure, comprising: an inner ring spaced within an outer ring to define an annulus between said rings; a restriction at which the annulus is narrowed radially by at least one projection that extends radially into the annulus from at least one of said rings toward the other of said rings; at least one elongate heating element extending generally longitudinally along the annulus and continuously through the restriction; and one or more in situ-moulded sealing masses that close the restriction radially and that embed the or each heating element in the restriction, such that the or each heating element extends continuously through the respective one or more sealing masses.

2. The structure of claim 1, further comprising at least one insulating layer disposed in the annulus on a radially outer side of the or each heating element, which insulating layer is interrupted longitudinally at the restriction.

3. The structure of claim 1, wherein at least one projection that defines the restriction comprises longitudinally-opposed inclined shoulders that define longitudinally-tapering spaces of the annulus.

4. The structure of claim 3, wherein the or each sealing mass extends into the longitudinally-tapering spaces.

5. The structure of claim 1, wherein the or each heating element extends longitudinally across at least one projection that defines the restriction, by following an external contour of that projection.

6. The structure of claim 1, wherein the or each heating element extends along a female formation that is provided in at least one projection defining the restriction or that is provided between at least two of such projections.

7. The structure of claim 6, wherein the female formation is a bore defined at least partially by a groove or a hole in or between the or each projection.

8. The structure of claim 7, wherein the restriction further comprises at least one wall that bridges the restriction radially.

9. The structure of claim 1, wherein the restriction comprises a plurality of circumferentially-spaced bores.

10. The structure of claim 1, wherein the restriction is circumferentially continuous around the inner ring, being partially defined by a circumferentially-continuous land of the or each radially-extending projection.

11. The structure of claim 1, wherein the restriction is defined between an inner projection that projects radially outwardly from the inner ring and an outer projection that projects radially inwardly from the outer ring.

12. The structure of claim 11, wherein: the projections confront each other across the narrowed annulus; and the or each sealing mass seals against the projections and around the or each heating element extending through a gap between the projections, to close the gap.

13. The structure of claim 11, wherein: the projections abut or join each other across the annulus; and a respective sealing mass seals around the or each heating element extending through one or more bores between the projections, to close the or each bore.

14. The structure of claim 1, further comprising at least one circumferentially-extending filling channel that communicates between at least one port in the outer ring and the restriction.

15. A method of sealing an annulus of an electrically trace-heated pipe-in-pipe structure, which annulus is defined between an inner ring and an outer ring spaced outside the inner ring, the method comprising introducing a flowable filler material to mould in situ one or more sealing masses that close a restriction at which the annulus is narrowed radially and that embed at least one heating element that extends generally longitudinally and continuously through the restriction, such that the at least one heating element extends continuously through the one or more sealing masses.

16. The method of claim 15, comprising placing the or each heating element into the restriction before moulding the filler material.

17. The method of claim 15, comprising creating the restriction around the or each heating element before moulding the filler material.

18. The method of claim 15, comprising introducing the filler material into the restriction through the outer ring.

19. The method of claim 18, comprising distributing the filler material circumferentially before the filler material enters the restriction.

20. The method of claim 15, comprising extending the sealing mass into at least one space of the restriction at which the annulus tapers longitudinally.

21. An electrically trace-heated pipe-in-pipe structure, comprising:
- an inner ring spaced within an outer ring to define an annulus between said rings;
- a restriction at which the annulus is narrowed radially by at least one projection that extends radially into the annulus from at least one of said rings toward the other of said rings; at least one elongate heating element extending generally longitudinally along the annulus and through the restriction;
- one or more in situ-moulded sealing masses that close the restriction radially and that embed the or each heating element in the restriction; and
- at least one circumferentially-extending filling channel that communicates between at least one port in the outer ring and the restriction to admit filler material to form the one or more sealing masses.

* * * * *